United States Patent [19]

Yoshioka et al.

[11] Patent Number: 5,606,709
[45] Date of Patent: Feb. 25, 1997

[54] IMPROVED REGISTER GROUP CIRCUIT FOR DATA PROCESSING SYSTEM

[75] Inventors: Keiichi Yoshioka, Sanda; Shinichi Yamaura, Kobe; Kazuhiko Hara; Takao Katayama, both of Ikeda, all of Japan

[73] Assignee: Ricoh Company, Ltd., Tokyo, Japan

[21] Appl. No.: 344,365

[22] Filed: Nov. 23, 1994

[30] Foreign Application Priority Data

Nov. 26, 1993 [JP] Japan .................................. 5-296412

[51] Int. Cl.$^6$ ............................ G06F 13/20; G06F 13/40
[52] U.S. Cl. ...................... 395/800; 395/307; 395/308; 364/DIG. 1; 364/DIG. 2; 365/220
[58] Field of Search .................................... 395/800, 856, 395/115, 113, 550, 112, 375, 500, 285, 421.01, 200.01, 309, 308, 200, 307, 183.06, 200.21; 365/78, 105, 189.02, 205, 149, 220, 203.05; 364/DIG. 1, DIG. 2, 728.01

[56] References Cited

U.S. PATENT DOCUMENTS

| | | | |
|---|---|---|---|
| 4,725,987 | 2/1988 | Cates | 365/220 |
| 5,197,035 | 3/1993 | Ito | 365/230.05 |
| 5,333,282 | 6/1994 | Maejima et al. | 395/375 |
| 5,341,506 | 8/1994 | Nohmi et al. | 395/800 |

*Primary Examiner*—Daniel H. Pan
*Attorney, Agent, or Firm*—Cooper & Dunham LLP

[57] ABSTRACT

A general-purpose register group circuit provided in a data processing system includes a plurality of register groups connected to a first bus and a second bus, data being written into the plurality of register groups via the first bus according to a first control signal and being read therefrom via the second bus according to a second control signal. An output register group is connected to the plurality of register groups via the first and second buses. The data read from the plurality of register groups is written into the output register group according to a third control signal, and data read from the output register group is sent to an inner bus of the data processing system according to a fourth control signal. Each of the plurality of register groups includes a plurality of unit registers, each of which registers includes a first part for setting the second bus to either a high-impedance state or a reference level according to data latched therein and the second control signal. The output register group includes a second part for driving the inner bus according to a state of the second bus.

16 Claims, 13 Drawing Sheets

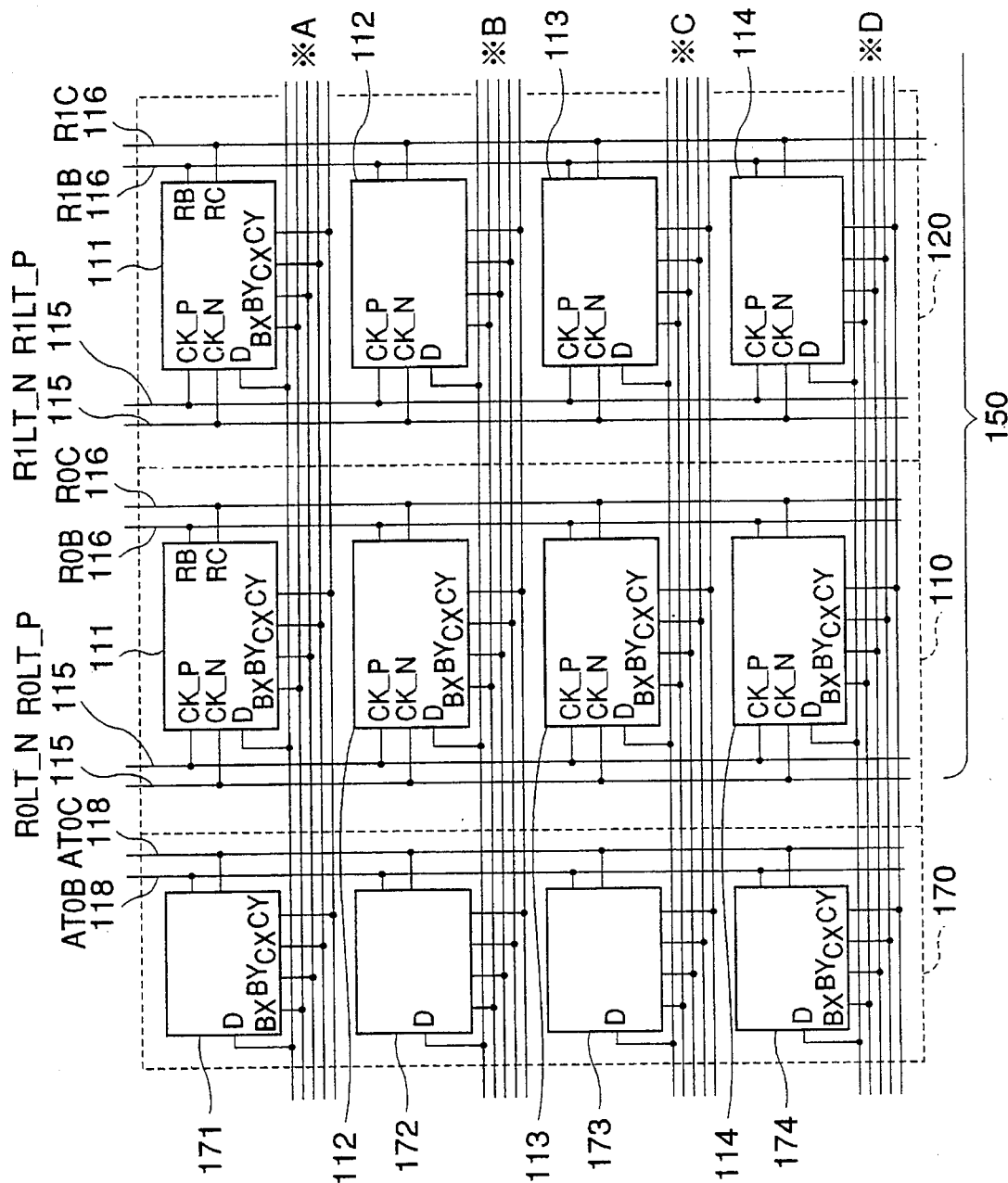

◨ CONTACT    ▦ POLYSILICON
▨ P+ FIELD    ☐ METAL
▧ N+ FIELD

IMPROVED REGISTER GROUP CIRCUIT FOR DATA PROCESSING SYSTEM

BACKGROUND OF THE INVENTION

1. Field of the Invention

The present invention generally relates to data processing systems such as central processing units (hereinafter, referred to CPUs), and more particularly to a general-purpose register group circuit used in the data processing systems.

2. Description of the Prior Art

Conventionally, data processing systems such as CPUs are equipped with a general-purpose register group circuit comprised of a plurality of groups of registers. The general-purpose register group circuit is used to hold data used for one or a plurality of data operations or address operations and the results of such operations. The general-purpose register group circuit is connected to a plurality of buses within the CPU.

FIG. 1 shows a prior art of a conventional general-purpose register group circuit, which includes four general-purpose register groups 10 through 13, each of the register groups having four four-bit registers. The register groups 10 through 13 are connected to internal buses 20, 21 and 22 (these reference numbers are omitted from FIG. 1 for the sake of convenience). The internal bus 20 has bus lines 20a, 20b, 20c and 20d, and the internal bus 21 has bus lines 21a, 21b, 21c and 21d. Further, the internal bus 22 has bus lines 22a, 22b, 22c and 22d.

More particularly, data is supplied to the register groups 10–13 via the internal bus 20, and data from the register groups 10–13 are supplied to ether the internal bus 21 or 22. The data can be latched in each of the register groups 10–13 in response to respective register control signals. More particularly, these register control signals include register input control signals RdxLT_P and RxLT_N where X is the identification number of the register groups. For example, the register group 10 latches data supplied via the internal bus 20 in response to the register input control signals ROLT_P and ROLT_N. The data from the register groups 10–13 can be read therefrom for each register group in response to register output control signals. More particularly, these register output control signals include register output control signals RxB and RxC where x is the identification number of the register groups. For example, data is read from the register group 10 and output to the internal bus 21 or 22 in response to the register output control signals ROB and ROC.

FIGS. 2 and 3 are block diagrams of a one-bit circuit of each register provided in each of the register groups 10–13 (hereinafter such as circuit is referred to as a unit register). The symbols CK_P, CK_N, D, RB, RC, BOUT and COUT shown in FIG. 1 correspond to corresponding terminals shown in FIGS. 2 and 3. The unit register shown in FIG. 2 is comprised of a latch unit 30 and an output unit 40. Similarly, the unit register shown in FIG. 3 is comprised of the same latch unit 30 and an output unit 50. That is, the structure of the output unit 40 shown in FIG. 2 differs from that of the output unit 50 shown in FIG. 3.

More particularly, the output unit 40 of the unit register shown in FIG. 2 includes inverters 41 and transmission gates 42. In order to control the transmission gates 42, the output unit 40 needs, for one internal bus, for example, the internal bus 21, the register output control signals RxLT_P and RxLT_N respectively applied to the terminals RB_P and RB_N as well as the register output control signals RxB, and RxC respectively applied to the terminals RC_P and RC_N.

The output unit 50 of the unit register shown in FIG. 3 includes two-input NAND gates 51 and two tri-state gates 52. In order to control the tri-state gates 52, the output unit 50 needs, for one internal bus, for example, the internal bus 21, the register output control signals RB and RC. Regarding the register output control signals, the circuit configuration shown in FIG. 3 is advantageous over that shown in FIG. 2 because the number of control signals necessary for the circuit configuration shown in FIG. 3 is less than that used in the circuit configuration shown in FIG. 2. One inverter 41 and one transmission gate 42 shown in FIG. 2 needs four transistors, while one NAND gate 51 and one tri-state gate 52 needs seven transistors. In this regard, the circuit configuration shown in FIG. 3 is advantageous over that shown in FIG. 2.

In common with the circuits shown in FIGS. 2 and 3, each unit register directly sends data to the internal bus 21 or 22, to which a number of unit registers are connected. Hence, each internal bus has a heavy load. With the above in mind, each unit register is designed to have transistors of a large size to drive the internal bus having a heavy load. However, the larger the number of unit registers, the greater the chip area occupied by the general-purpose register group circuit.

In the unit register shown in FIG. 3, it is possible to perform the data read and write operations within the same machine cycle. Referring to FIG. 4, when the control signal RxLT_P supplied to the terminal CK_P is switched to the high level (H), and the register output control signal RB is switched to the high level, data from the internal bus 20 can be latched and data can be sent to the internal bus 21 within the same machine cycle. However, in this case, the data passes through a path indicated by the thick solid line shown in FIG. 4. Hence, as shown in FIG. 5, the data is output to the internal bus 21 with a time delay of A.

SUMMARY OF THE INVENTION

It is a general object of the present invention to provide a general-purpose register group circuit which can be provided in a data processing system in which the above disadvantages of the conventional circuits are eliminated.

A more specific object of the present invention is to provide a general-purpose register group circuit provided in a data processing system in which the register group circuit can be controlled by a reduced number of control signal lines and has a reduced chip area and a reduced time delay occurring in the data read and write operations.

The above objects of the present invention are achieved by a general-purpose register group circuit provided in a data processing system, the general-purpose register group circuit comprising:

a plurality of register groups connected to a first bus and a second bus, data being written into the plurality of register groups via the first bus according to a first control signal and being read therefrom via the second bus according to a second control signal; and an output register group connected to the plurality of register groups via the first and second buses, the data read from the plurality of register groups being written into the output register group according to a third control signal, data read from the output register group being sent to an inner bus of the data processing system according to a fourth control signal, each of the plurality of register groups comprising a plurality of unit registers, each of which registers comprises first means for setting the second bus to either a high-impedance state or a reference level according to data latched therein and the second control signal, the output register group comprising second means for driving the inner bus according to a state of the second bus.

A further object of the present invention is to provide a data processing system equipped with the above-mentioned general-purpose register group circuit.

This object of the present invention is achieved by a data processing system comprising:

instruction decoding means for decoding an instruction and deriving control signals therefrom; and instruction executing means, operatively coupled to the instruction decoding means, for performing an operation on data according to the control signals. The instruction executing means comprises a general-purpose register group circuit for storing data processed in the instruction executing means, and is configured as described above.

BRIEF DESCRIPTION OF THE DRAWINGS

Other objects, features and advantages of the present invention will become more apparent from the following detailed description when read in conjunction with the accompanying drawings, in which:

FIGS. 6A and 6B are block diagrams of a general-purpose register group circuit according to an embodiment of the present invention;

DESCRIPTION OF THE PREFERRED EMBODIMENTS

Figure 6B:
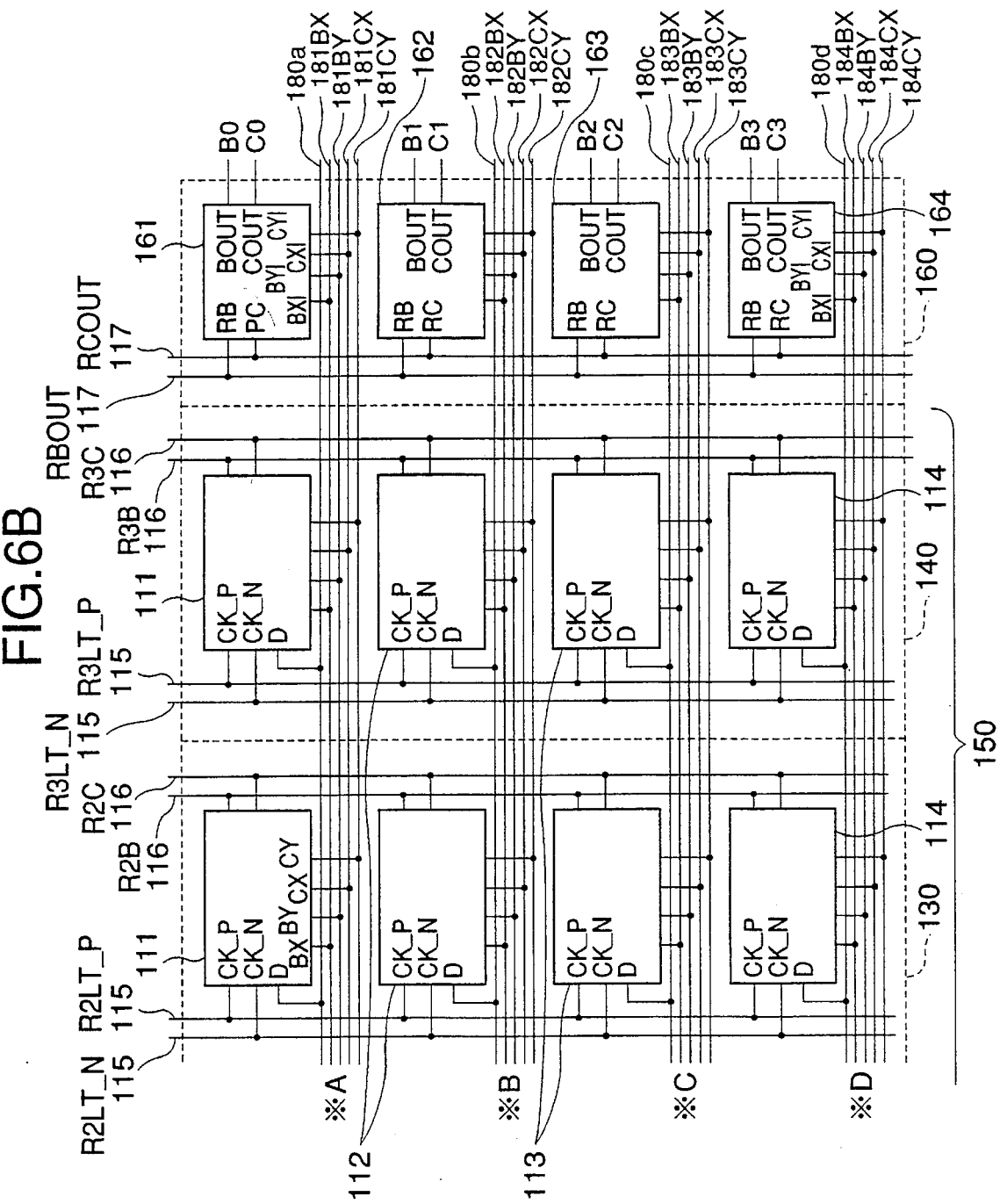

FIGS. 6A and 6B are block diagrams of a general-purpose register group circuit provided in a CPU according to an embodiment of the present invention.

As shown in FIGS. 6A and 6B, the general-purpose register group circuit includes a general-purpose register group block 150, an output register group 160 and a bus select unit 170. Symbols *A, *B, *C and *D shown in FIG. 6A are respectively connected to the same symbols as above shown in FIG. 6B. The bus select unit 170 can be arbitrarily provided or omitted.

The general-purpose register group block 150 includes four register groups 110, 120, 130 and 140, each of which groups is made up of four unit registers 111 through 114, each unit register being capable of storing data. Of course, the number of register groups and the number of unit registers forming each register group are not limited to the above.

The unit registers 111–114 are connected to a data bus 180 including data bus lines 180a, 180b, 180c and 180d, respectively. Each of the unit registers 111–114 has a data input terminal D, register input control signal input terminals CK_P and CL_N, register output control signal input terminals RB and RC, and data output terminals BX, BY, CX and CY. The data input terminals D of the unit registers 111–114 receive data transferred via the data bus lines 180a–180d, respectively. The register input control signal input terminals CK_P and CK_N of each of the unit registers 111–114 respectively receive register input control signals RxLT_P and RxLT_N, which indicate whether the data transferred via the data bus 180 should be latched in the corresponding unit register. It will be noted that symbol "x" in RxLT_P and RxLT_N denotes the number of the register groups 110–140 and is equal to 0–3 in the structure shown in FIGS. 6A and 6B.

The register output control signal input terminals RB and RC of each of the unit registers 111–114 respectively receive register output control signals RxB and RxC (the above definition of symbol "x" holds true for these signals), which indicate whether the latched data should be output via the data output terminals BX, BY, CX and CY. In the embodiment being considered, as will be described later in detail, each of the unit registers 111–114 has data output terminals (BX, BY, CX, CY) equal in number to twice the number n (n is an integer) of inner write bus lines extending from each of unit output registers 161–164 forming the output register group 160 within the CPU. That is, in the embodiment being considered, two inner write bus lines in the CPU are provided for one unit output register 161. Hence, each of the unit registers 111–114 is equipped with the four data output terminals BX, BY, CX, CY. As will be seen from the above, the number of data output terminals of each of the unit registers 111–114 depends on the number of inner write bus lines.

The registers 111–114 are connected in parallel with register input control signal lines 115 and register output control signal lines 116. The register control signals RxLT_P and RxLT_N are carried on the signal lines 115, and the register control signals RxB and RxC are carried on the signal lines 116.

The data output terminals BX respectively provided in the unit registers 111 of the register groups 110, 120, 130 and 140 are connected to a specifically used write bus line 181BX, and the data output terminals BY provided therein are connected to a specifically used write bus line 181BY. Further, the data output terminals CX respectively provided in the unit registers 111 of the register groups 110, 120, 130 and 140 are connected to a specifically used write bus line 181CX, and the data output terminals CY respectively provided therein are connected to a specifically used write bus line 181CY. The data output terminals BX, BY, CX and CY provided in the other unit registers 112–114 are connected to specifically used write buses 182BX–184BX, 182BY–184BY, 182CX–184CX and 182CY–184CY in the same way as those provided in the unit register 111.

Figure 7:
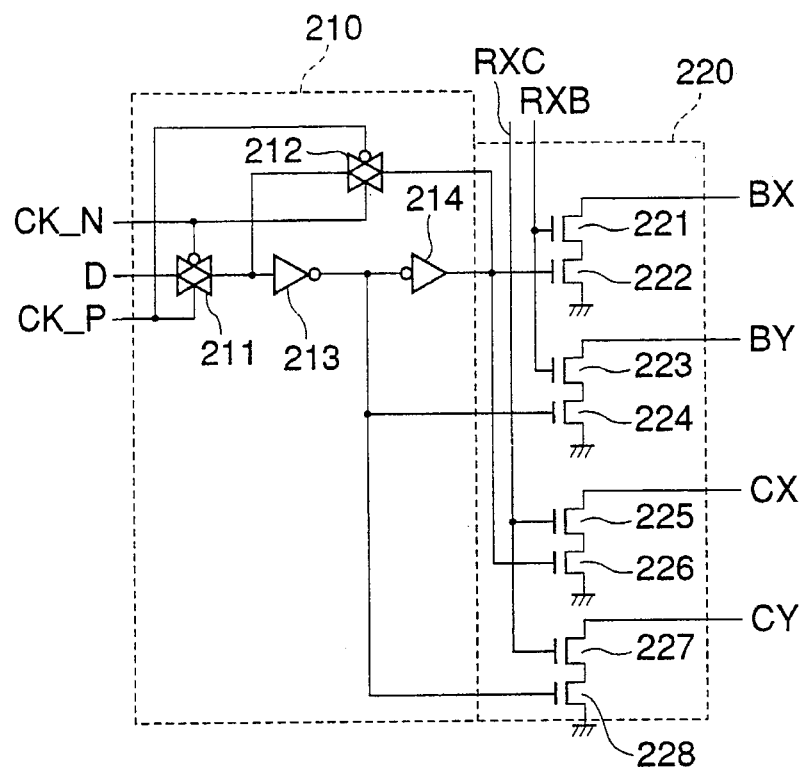
FIG. 7 is a circuit diagram of each unit register shown in FIG. 6B.

FIG. 7 is a circuit diagram of each of the unit registers 111–114. The symbols shown in FIG. 7 are the same as those shown in the previously described figures.

As shown in FIG. 7, each unit register is made up of a latch unit 210 and an output unit 220. The latch unit 210 latches data. The output unit 220 performs an output control of the data latched in the latch unit 210 in response to the register output control signals RxB and RxC. As depicted in FIG. 7, the latch circuit 210 includes transmission gates 211 and 212 and inverters 213 and 214, and has the same configuration as that of the latch circuit 30 shown in FIG. 2 or FIG. 3. The switching operations of the transmission gates 211 and 212 are controlled by the register input control signals RxLT_P and RxLT_N.

The output unit 220 is configured as follows. Regarding the data output terminal BX, for instance, two N-channel field effect transistors (FETs) 221 and 222 are connected in series between the data output terminal BX and the ground. Similarly, two N-channel transistors 223 and 224 are connected in series between the data output terminal BY and the ground, and two N-channel transistors 225 and 226 are connected in series between the data output terminal CX and the ground. Further, two N-channel transistors 227 and 228 are connected in series between the data output terminal CY and the ground. The gates of the N-channel transistors 221 and 223 are connected to the register output control signal line via which the register output control signal RxB is transferred. The gates of the N-channel transistors 225 and 227 are connected to the register output control signal line via which the register output control signal RxC is transferred. Further, the gates of the N-channel transistors 222 and 226 are connected to the output of the inverter 214, and the gates of the N-channel transistors 224 and 228 are connected to the output of the inverter 213. It is preferable that the N-channel transistors be formed with MOS (Metal Oxide Semiconductor) transistors.

It can be seen from the above that the lines BX, BY, CX and CY are set to either the low (ground) level or the high-impedance state because the output unit 220 is made up of only N-channel transistors.

The output register group 160 shown in FIG. 6B includes unit output registers 161–164 equal in number to the unit registers 111–114 of each of the register groups 110–140. In the embodiment being considered, the output register group 160 is made up of four unit output registers 161–164.

As shown in FIG. 6B, each of the unit output registers 161–164 has output control signal input terminals RB and RC, which are connected to output control signal lines 117. Output control signals RBOUT and RCOUT, which indicate whether data should be output, are transferred via the output control signal lines 117. Further, each of the unit output registers 161–164 has data input terminals BXI, BYI, CXI and CYI, which are respectively connected to the write bus lines such as 181BX, 181BY, 181CX and 181CY. Data supplied from the unit registers 111–114 is latched in the unit output registers 161–164. Furthermore, each of the unit output registers 161–164 has data output terminals BOUT and COUT via which data is output to the write buses therefrom.

More specifically, the data input terminals BXI, BYI, CXI and CYI of the unit output register 161 are respectively connected to the write buses 181BX, 181BY, 181CX and 181CY. The data input terminals BXI, BYI, CXI and CYI of the unit output register 162 are respectively connected to the write buses 182BX, 182BY, 182CX and 182CY. The data input terminals BXI, BYI, CXI and CYI of the unit output register 163 are respectively connected to the write buses 183BX, 183BY, 183CX and 183CY. The data input terminals BXI, BYI, CXI and CYI of the unit output register 164 are respectively connected to the write buses 184BX, 184BY, 184CX and 184CY.

Figure 8:
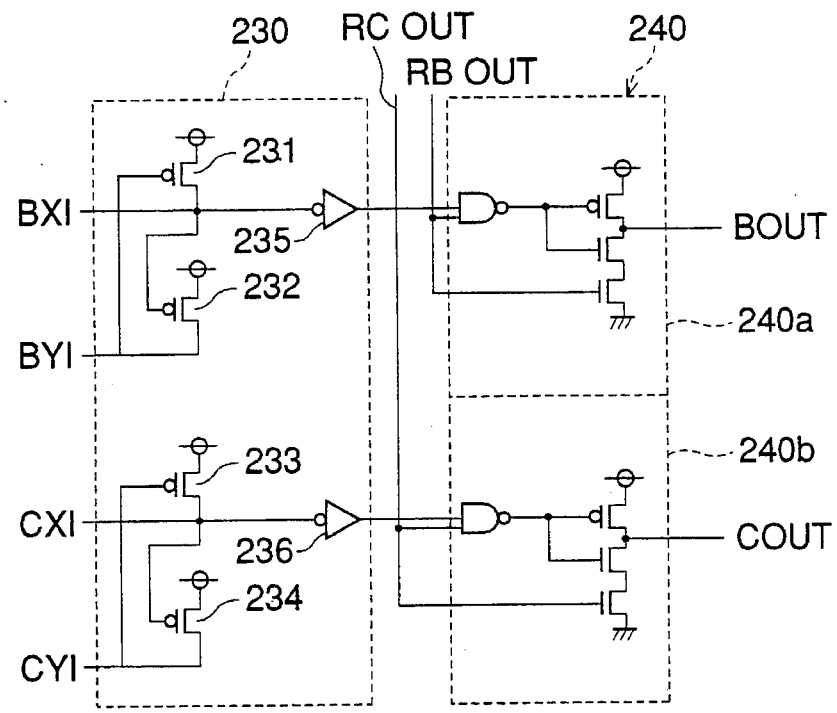
FIG. 8 is a circuit diagram of each unit output register shown in FIGS. 6A and 6B.

FIG. 8 is a circuit diagram of each of the unit output registers 161–164, which is made up of an input unit 230, and an output unit 240 having transmission gates 240a and 240b. The input unit 230 includes P-channel transistors and inverters. It is preferable that the P-channel transistors be formed with MOS transistors.

The input unit 230 is configured as follows. In order to reduce the size of each unit register, the output unit 220 shown in FIG. 7 is formed with only N-channel transistors. In order to drive the inner buses B and C, each of the unit output registers 161–164 includes P-channel transistors.

Regarding the data input terminals BXI and BYI for example, the data input terminal BXI is connected to the drain of the P-channel transistor 231 and the gate of the P-channel transistor 232. The sources of the P-channel transistors 231 and 232 are connected to a power supply line (Vcc). The data input terminal BYI is connected to the drain of the P-channel transistor 232 and the gate of the P-channel transistor 231. The data input terminals CXI and CYI are connected to the P-channel transistors 233 and 234 in the same way as the data input terminals BXI and BYI. The drain of the P-channel transistor 231 is connected to the input of the transmission gate 240a via the inverter 235. The drain of the P-channel transistor 233 is connected to the input of the transmission gate 240b via the inverter 236.

The transmission gates 240a and 240b have an ordinary circuit configuration, and hence a description thereof will now be omitted here. The transmission gate 240a sends predetermined data to the data output terminal BOUT in accordance with the output control signal RBOUT. The transmission gate 240b sends predetermined data to the data output terminal COUT in accordance with the output control signal RCOUT.

The bus select unit 170 shown in FIG. 6A includes unit bus selectors 171–174 equal in number to the unit registers 111–114 of each of the register groups 110–140. Each of the unit selectors 171–174 has data output terminals BX, BY, CX and CY via which data is output to the write bus lines such as 181BX, 181BY, 181CX and 181CY. Further, each of the unit selectors 171–174 has bus select unit control signal input terminals ATB and ATC, and a data input terminal D. The input terminals ATB and ATC are connected to bus select unit control signal lines 118 via which bus select unit control signals ATOB and ATOC are transferred. These signals ATOB and ATOC are used in a case where data stored in the unit registers 111–114 is not sent to the write buses 181BX and the like and data is sent thereto from the unit bus selectors 171–174. The data input terminals of the unit bus selectors 171–174 receive data via the data buses 180a through 180d.

More particularly, the data output terminals BX, BY, CX and CY of the unit bus selector 171 are respectively connected to the write buses 181BX, 181BY, 181CX and 181CY. Similarly, the data output terminals BX, BY, CX and CY of the unit bus selector 172 are respectively connected to the write buses 182BX, 182BY, 182CX and 182CY. The data output terminals BX, BY, CX and CY of the unit bus selector 173 are respectively connected to the write buses 183BX, 183BY, 183CX and 183CY. The data output terminals BX, BY, CX and CY of the unit bus selector 174 are respectively connected to the write buses 184BX, 184BY, 184CX and 184CY.

Figure 9:
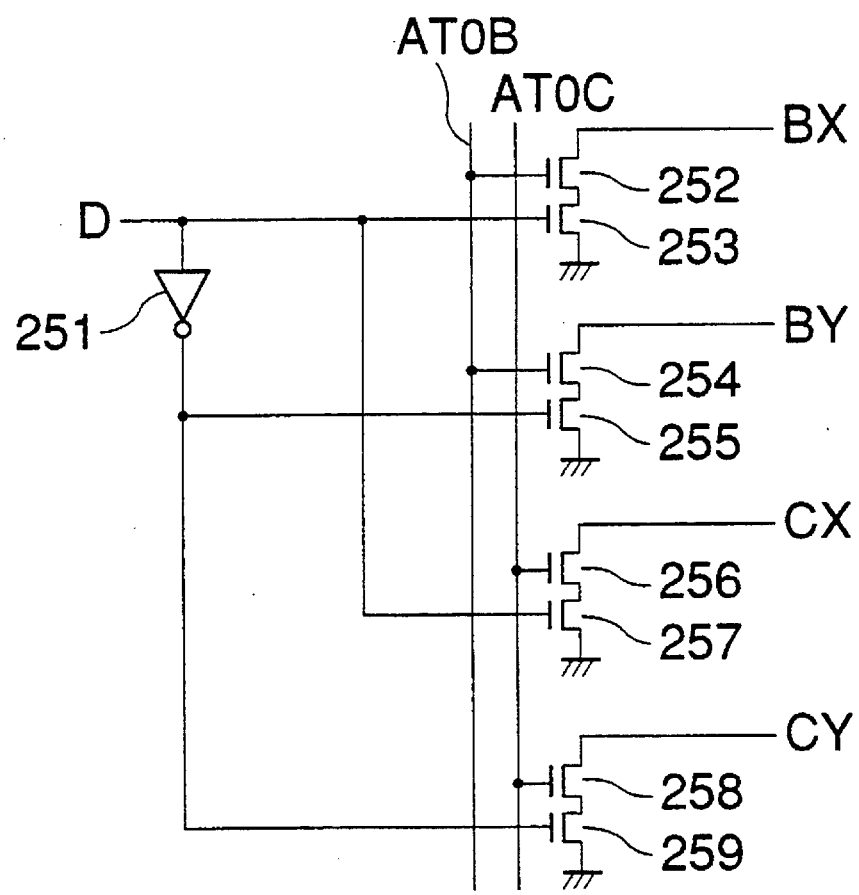
FIG. 9 is a circuit diagram of each unit bus selector shown in FIG. 6A.

FIG. 9 is a circuit diagram of each of the unit bus selectors 171–174. Regarding the data output terminal BX, two N-channel transistors 252 and 253 are connected in series between the data output terminal BX and the ground. Similarly, with respect to the data output terminal BY, two N-channel transistors 254 and 255 are connected in series between the data output terminal BY and the ground. Regarding the data output terminal CX, two N-channel transistors 256 and 257 are connected in series between the data output terminal CX and the ground. Regarding the data output terminal CY, two N-channel transistors 258 and 259 are connected in series between the data output terminal CY and the ground.

The data input terminal D is connected to the gates of the N-channel transistors 253 and 257, and is connected via an inverter 251 to the gates of the N-channel transistors 255 and 259. Further, the bus select unit control signal input terminal ATB which carries the bus select unit control signal ATOB is connected to the gates of the N-channel transistors 252 and 254. Similarly, the bus select unit control signal input terminal ATC which carries the bus select unit control signal ATOC is connected to the gates of the N-channel transistors 256 and 258.

A description will now be given of the operation of the general-purpose register group circuit configured as described above.

First of all, an operation in which data is stored in the register groups 110–140 will be described. The register input control signal ROLT_N is set to the low level, and the register input control signal ROLT_N is set to the low level. Hence, the transmission gate 211 shown in FIG. 7 is turned ON, and data is loaded to the unit registers 111–114 of the register group 110 via the data input terminal D connected to the data bus lines 180a–180d, respectively. Then, the register input control signal ROLT_P is set to the low level, and the register input control signal ROLT_N is set to the high level. Hence, the data propagated through the data bus lines 180a–180d are held in the unit registers 111–114 of the register group 110.

The following operation relates to a case where data stored in the register group 130 is sent therefrom to the specifically used write bus lines 181BX, 181BY, 182BX, 182BY, 183BX, 183BY, 184BX and 184BY (hereinafter these bus lines are also referred to B-specific write bus lines) or to the specifically used write bus lines 181CX, 181CY, 182CX, 182CY, 183CX, 183CY, 184CX and 184CY (hereinafter these bus lines are also referred to C-specific write bus lines). The above data sending operation includes the following two types of control operations.

First, a case will be described where data storing and data reading on the same register group are not concurrently carried out.

The bus select unit control signals ATOB and ATOC are respectively set to the low level. Further, one of the register output control signals ROB, R1B, R2B and R3B or one of the register output control signals ROC, R1C, R2C and R3C are set to the high level. Furthermore, the output control signals RBOUT and RCOUT are set to the high levels.

As an example, the data sending operation on the register group 130 will now be described. The bus select unit control signal ATOC is set to the low level. Hence, as will be seen from FIG. 9, the N-channel transistors 256 and 258 of the unit bus selectors 171–174 are turned OFF. That is, the C-specific write bus lines are switched to the high-impedance state, so that data cannot be sent to the C-specific write bus lines from the unit bus selectors 171–174.

The output control signal RCOUT supplied to the output register group 160 is set to the high level. Further, in order to select the register group 130, the register output control signals ROC and R1C are set to the low level, and the register output control signal R2C is set to the high level. By setting the levels of the control signals as described above, data can be sent to the C-specific write bus lines from the register group 130. The data sent to the C-specific write bus lines is supplied to the data input terminals CXI and CYI of the unit output registers 161–164 of the output register group 106, and is then output via the data output terminals COUT of the unit output registers 161–164.

A case will now be described where the data storing and data sending operations on the same register group are concurrently carried out.

Either the bus select unit control signal ATOB or ATOC is set to the high level. Further, all of the register output control signals ROB, R1B, R2B, R3B, ROC, R1C, R2C and R3C are set to the low level. Furthermore, either the output control signal RBOUT or RCOUT supplied to the output register group 160 is set to the high level.

By way of an example, the data storing and sending operation on the register group 130 will now be described.

The bus select control signal ATOB is set to the high level. Hence, as will be seen from FIG. 9, the N-channel MOS transistors 252 and 254 of the unit bus selectors 171–174 of the bus select unit 170 are turned ON. As a result, the data carried via the data bus 180 and supplied to the unit bus selectors 171–174 of the bus select unit 170 is sent to the B-specific write bus lines.

Further, the output control signal RCOUT supplied to the output register group 160 is set to the high level, and all the register output control signals ROC, R1C, R2C and R3C are set to the low level. By setting the levels of the control signals as described above, data stored in the register groups cannot be group at all, and instead data is sent via the bus select unit 170. At this time, data can be stored in the register group 130 via the data bus 180 according to the aforementioned data storing operation.

Figure 10:
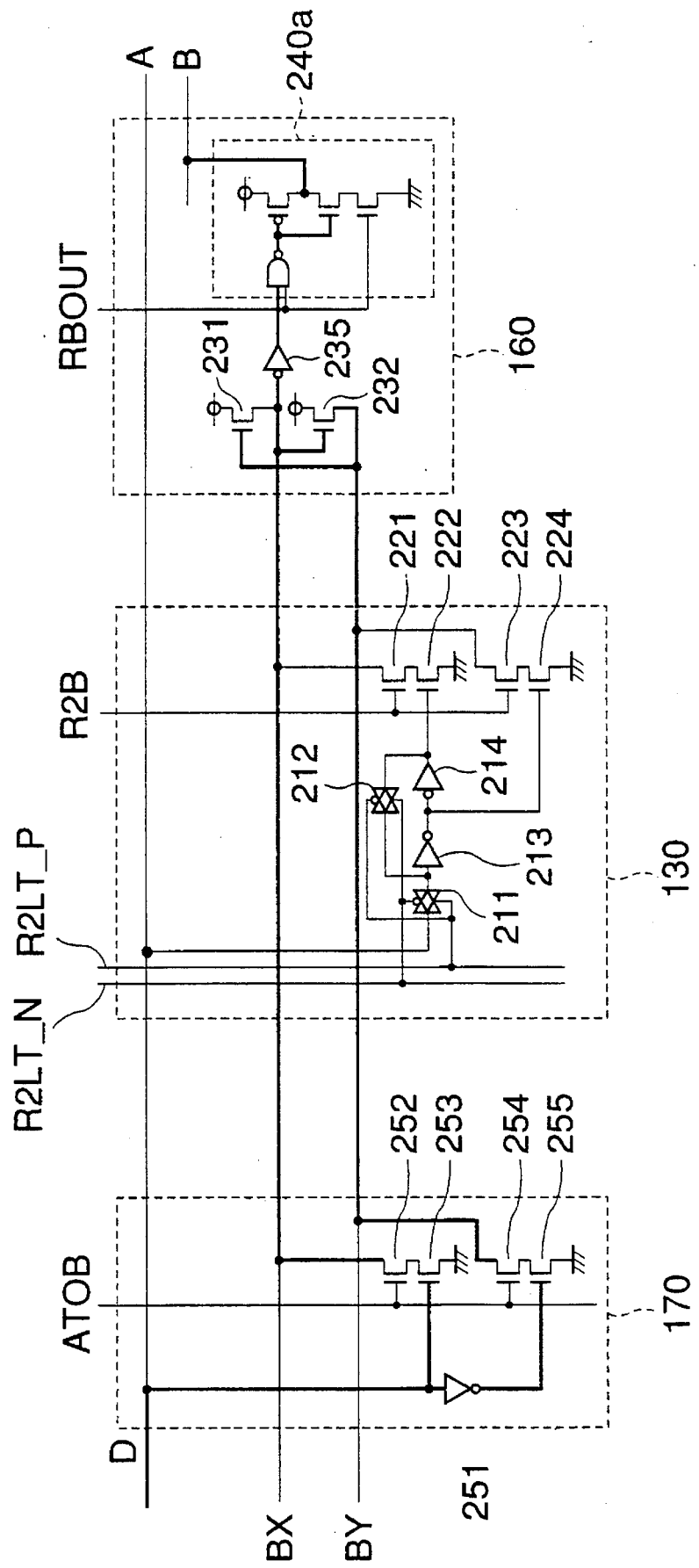
FIG. 10 is a diagram showing a data propagation in the embodiment of the present invention.

FIG. 10 is a diagram showing a delay in data transmission in the data sending operation performed when the data storing and sending operations on the register group 130 concurrently take place. In FIG. 10, the same reference numbers and symbols as those described previously are used. When the data storing operation and the stored data sending operation are concurrently carried out, the data transmission using the register groups is not carried out but the data transmission using the bus select unit 170 is carried out. Hence, it becomes possible to increase the data transmission rate, as compared with the data transmission using the register groups. In other words, a so-called forwarding process can be performed at high speed.

The above-mentioned general-purpose register group circuit provided in the CPU according to the embodiment of the present invention has the following advantages.

Figure 11A:
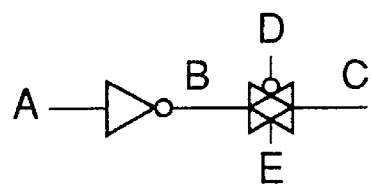
FIG. 11A is a block diagram of a part of an output unit of each unit register used in the conventional configuration shown in FIG. 2.
Figure 11B:
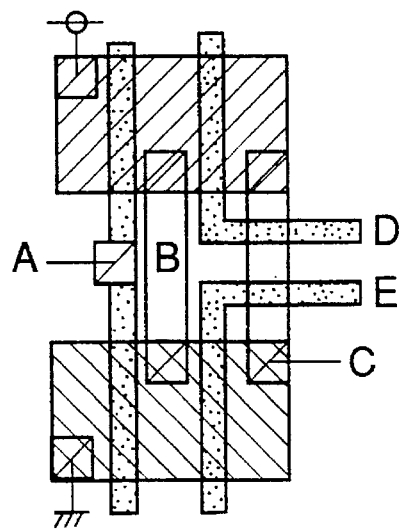
FIG. 11B is a plan view of a layout pattern of the configuration shown in FIG. 11A.

As shown in FIG. 7, the N-channel transistors are connected in series in the output unit 220, so that the circuit scale can be reduced. Generally, P-channel transistors have relatively large ON resistance values. Hence, when a P-channel transistor having the same driving ability as an N-channel transistor is provided, the P-channel transistor has to have a larger size than that of the N-channel transistor. Each register group shown in FIG. 2 needs 16 transistors including N-channel transistors and P-channel transistors because it has the inverters and transmission gates. FIG. 11A shows a part of each register group shown in FIG. 2 and is made up of 4 transistors. FIG. 11B shows a layout of the circuit shown in FIG. 11A. The layout shown in FIG. 11B occupies a large chip area.

Figure 1:
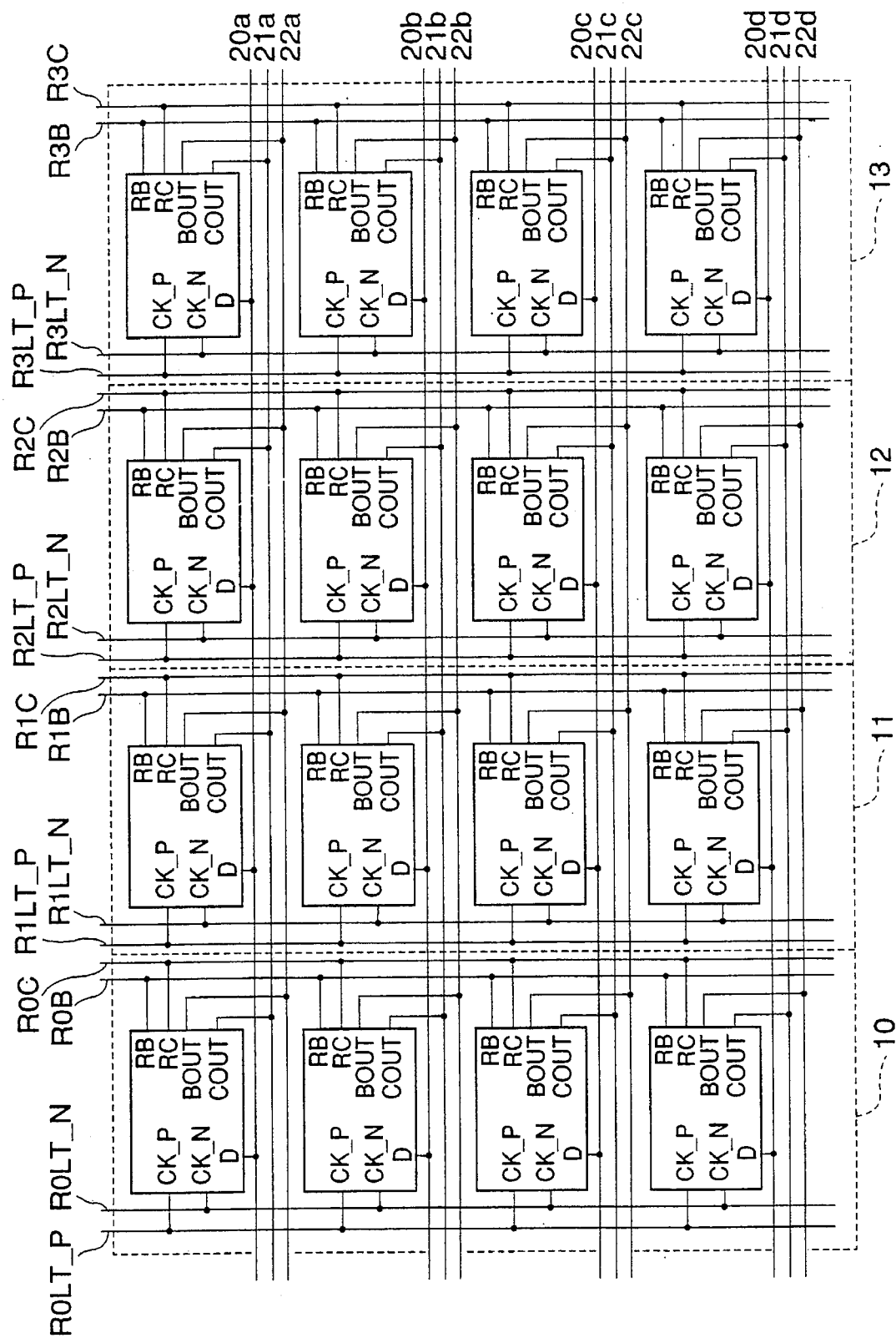
FIG. 1 is a block diagram of a conventional general-purpose register group circuit provided in a CPU.
Figure 2:
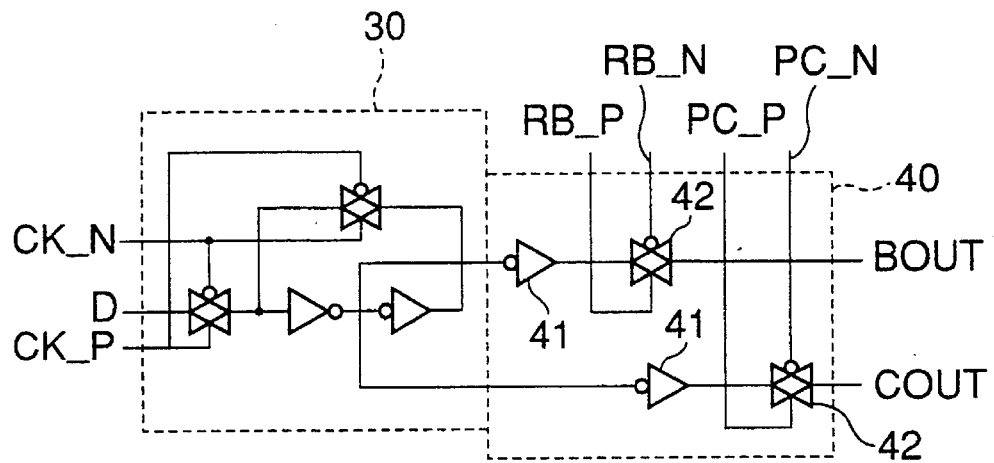
FIG. 2 is a block diagram of a structure of each unit register of the register group circuit shown in FIG. 1.
Figure 3:
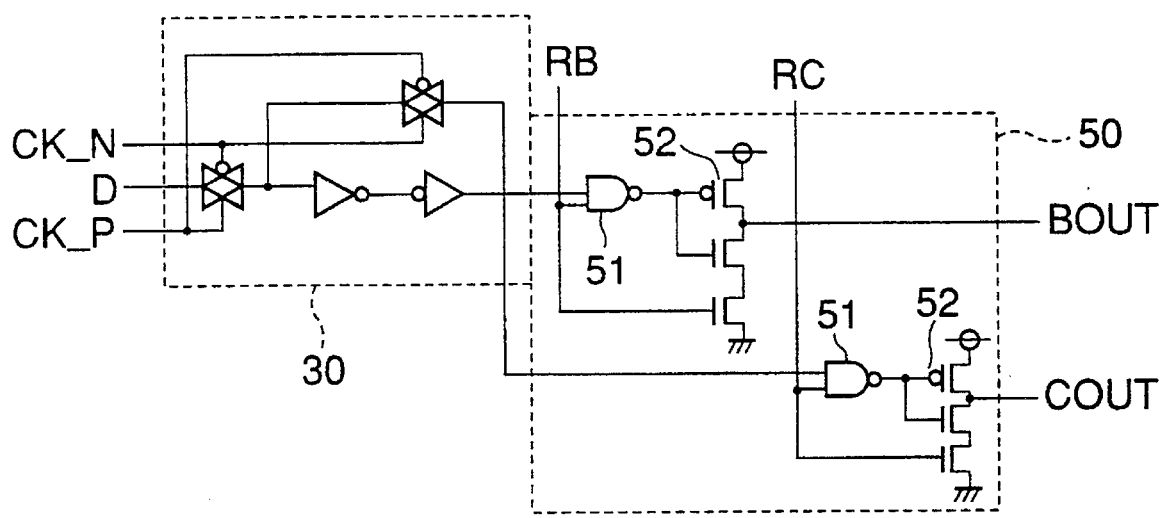
FIG. 3 is a block diagram of another structure of each unit register of the register group circuit shown in FIG. 1.
Figure 4:
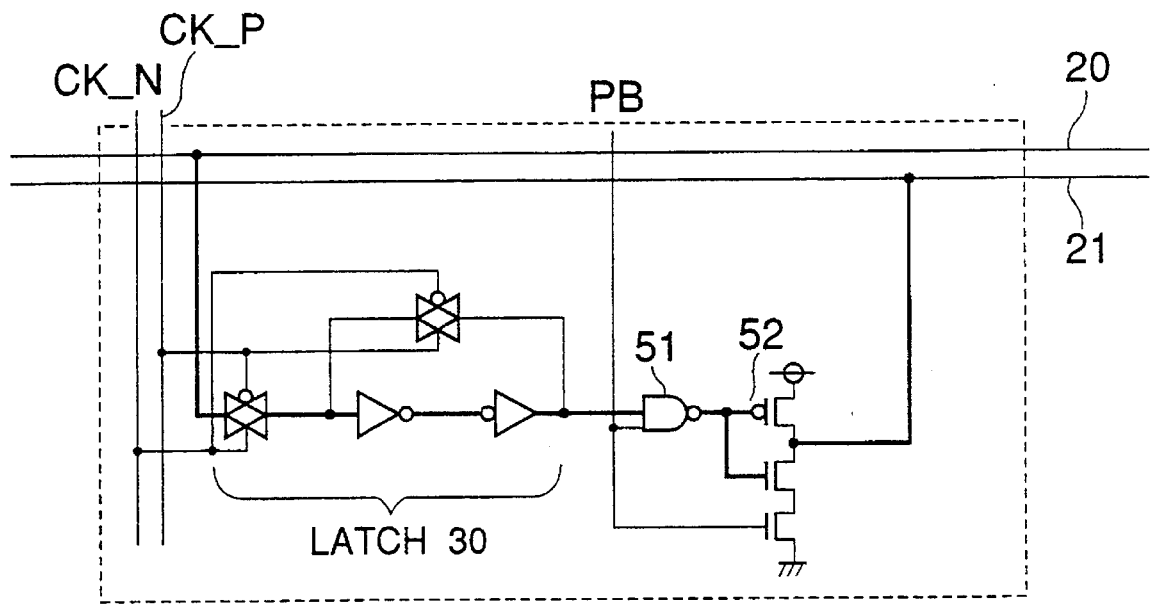
FIG. 4 is a block diagram showing a data transmission path in the unit register shown in FIG. 3.
Figure 5:
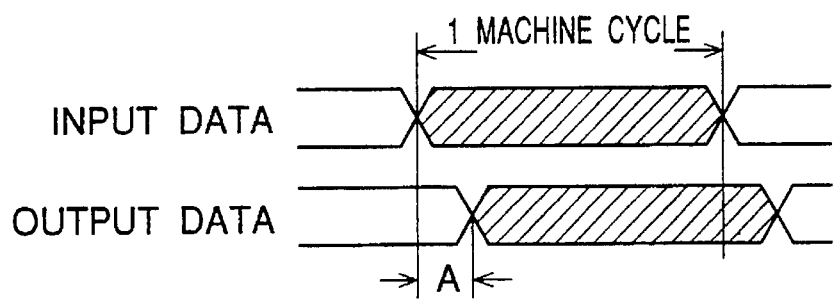
FIG. 5 is a timing chart showing a problem of the unit register shown in FIG. 3.
Figure 12A:
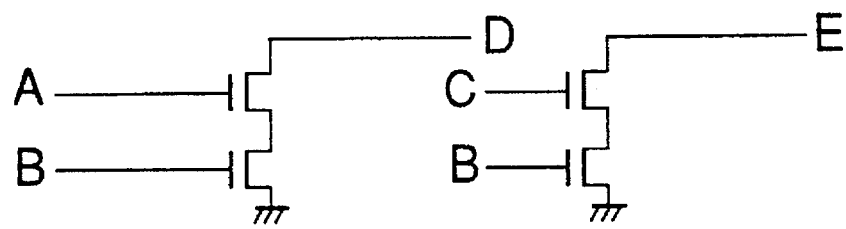
FIG. 12A is a circuit diagram of a part of an output unit of each unit register used in the embodiment of the present invention.
Figure 12B:
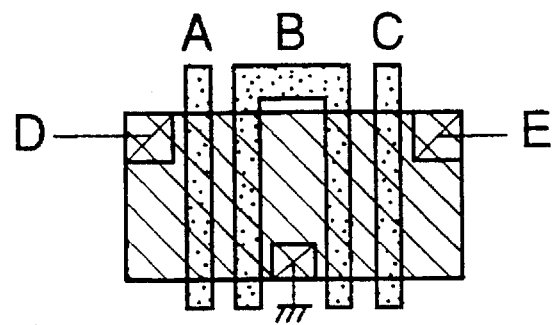
FIG. 12B is a plan view of a layout pattern of the configuration shown in FIG. 12A.

On the other hand, while each of the register groups 110–140 used in the embodiment of the present invention also needs 16 transistors, the circuit configuration shown in FIG. 7 does not have any P-channel transistors, and hence the size of the output unit 220 can be made smaller than that of the output unit 40 shown in FIG. 2. FIG. 12A shows a part of the output unit 220 shown in FIG. 7, and FIG. 12B shows a layout of the circuit shown in FIG. 12A. It can be seen by comparing FIGS. 11B and 12B that the chip area occupied by the circuit shown in FIG. 12A is much less than that occupied by the circuit shown in FIG. 11A. In FIG. 12A, the same symbols as those shown in FIG. 11A denote the same meanings.

Further, the aforementioned embodiment of the present invention has the following advantages. The B-specific write bus and the C-specific write bus are provided separately from the general inner write buses of the CPU, and connect the general-purpose register groups 110–140 and the output register group 160. Hence, it is possible to reduce the bus load in load in the output units of the unit registers 111–114 and hence reduce the size of the transistors forming the output units. Hence, the circuit size can be further reduced. This leads to speeding up of the operation of the general-purpose register group circuit.

Moreover, the two types of input control signals RxLT_N and RxLT_P are used for each of the register groups 110–140. In addition, the two types of output control signals RxB and RxC are also used for each of the register groups 110–140. In total, the four types of signals are used to control the register groups 110–140. That is, it is possible to form the general-purpose register group circuit with a reduced number of transistors and a reduced number of input/output control signals, thus reducing the circuit scale and increasing the operation speed.

In the aforementioned embodiment of the present invention, the N-channel transistors are used to form the output units 220 of the unit registers 111–114 and the unit output registers 161–164 of the output unit 220. Further, the P-channel transistors are used to form the input units 230 of the unit bus selectors 171–174. Since the output units 220 of the unit registers 111–114 are formed with only N-channel transistors, it is possible to drastically reduce the chip area occupied thereby.

A description will now be given of a CPU equipped with the above-mentioned general-purpose register group circuit.

Figure 13:
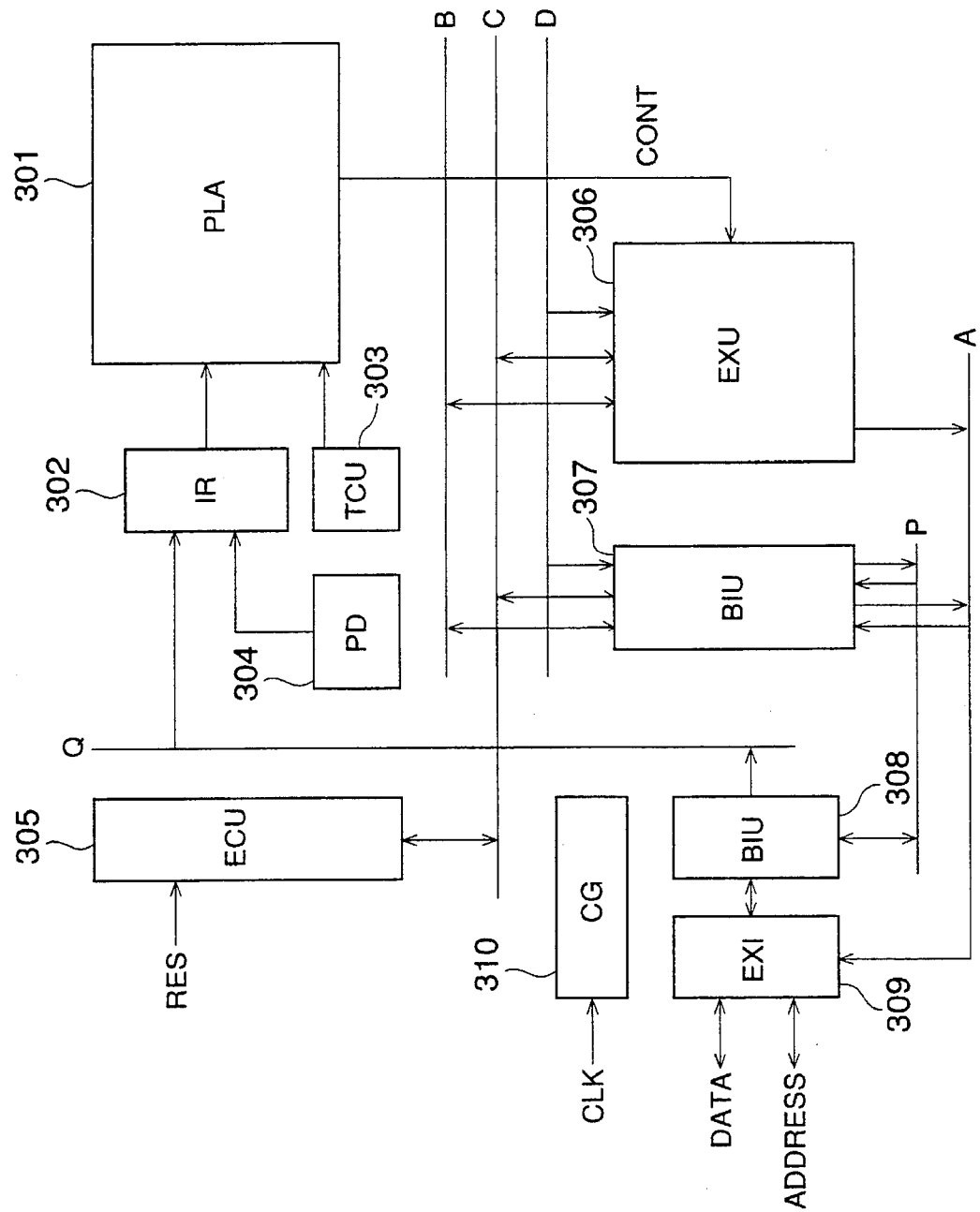
FIG. 13 is a block diagram of a central processing unit equipped with the general-purpose register group circuit according to the embodiment of the present invention.

FIG. 13 is a block diagram of a CPU equipped with the aforementioned general-purpose register group circuit. The CPU shown in FIG. 13 includes a programmable logic array (PLA) 301, an instruction register unit (IR) 302, a timing control unit (TCU) 303, an instruction predecoder (PD) 304, an exception control unit (ECU) 305, an execution unit (EXU) 306, a bus interface unit (BIU) 307, a bus interface unit (BIU) 308, an external interface unit (EXI) 309 and a clock generator (CG) 310.

The external interface unit 309 receives an instruction from the outside of the CPU, and outputs it to a bus Q via the bus interface unit 308. The instruction is predecoded by the predecoder 304, and is given to the programmable logic array 301 via the instruction register 302. The programmable logic array 301 operates with the timing defined by the timing control unit 303, and decodes the predecoded instruction. Then, the programmable logic array 301 generates control signals CONT, which are supplied to the execution unit 306 and the other constituent parts in the CPU. The execution unit 306 executes the instruction in accordance with the control signals CONT. Data can be transferred between the external interface unit 309 and the execution unit 306 via the bus interface units 307 and 308 and buses P and D. The address can be transferred between the external interface unit 309 and the execution unit 306 via the bus interface unit 308 and the bus A.

The bus B shown in FIG. 13 includes bus lines B0–B3 shown in FIG. 6B, and the bus C shown in FIG. 13 includes bus lines C0–C3 shown in FIG. 6B. The bus D shown in FIG. 13 includes the bus lines 180a–180d.

An instruction requesting an exception process is externally applied to the exception control unit 305, which notifies the execution unit 306 of the exception process via the bus C. The buses B and C are selectively used.

Figure 14:
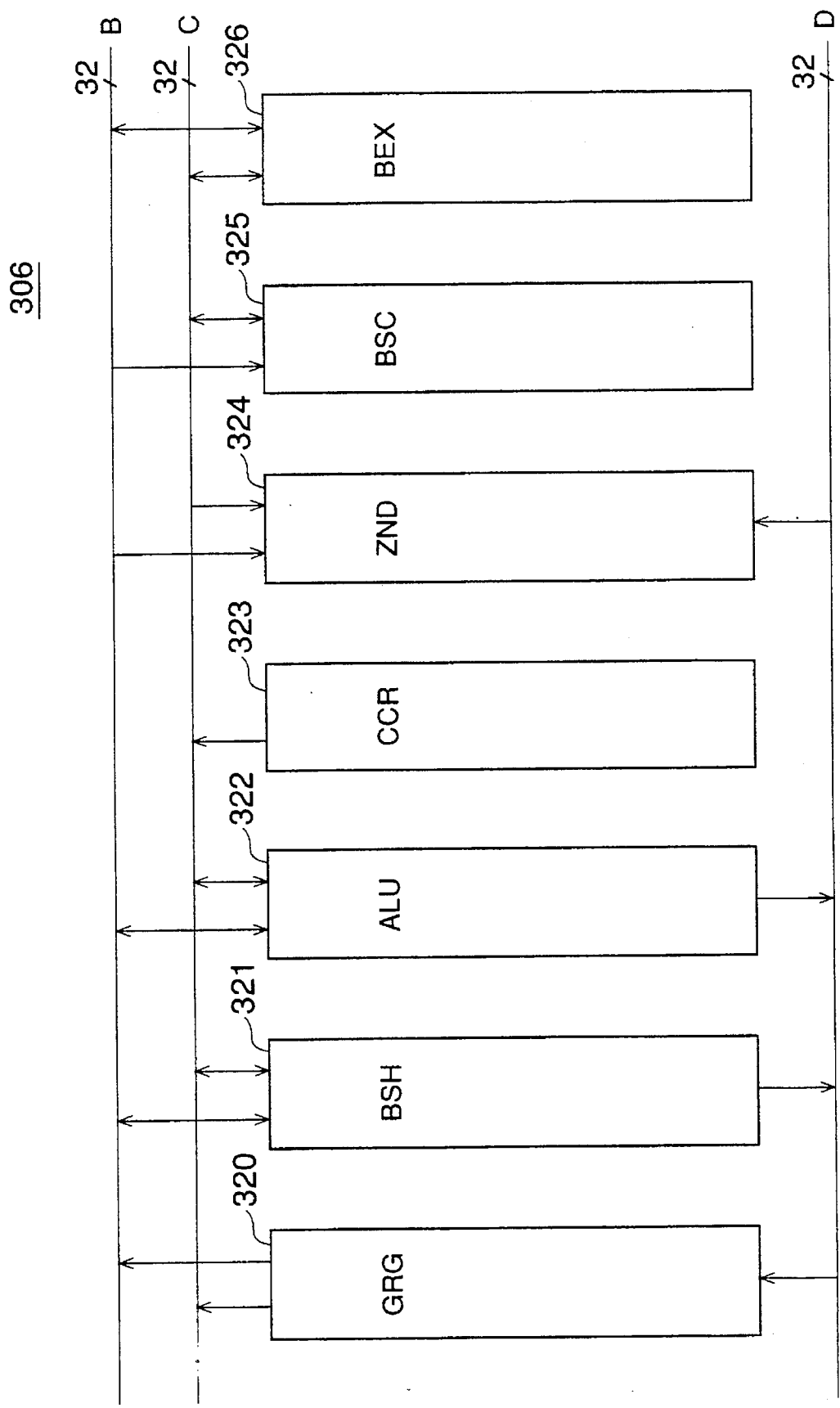
FIG. 14 is a block diagram of the structure of an execution unit shown in FIG. 13.

FIG. 14 is a block diagram of the execution unit 306 shown in FIG. 13. The execution unit 306 is made up of a general-purpose register group circuit (GRG) 320, a barrel shifter (BSH) 321, an arithmetic and logic unit (ALU) 322, a condition code register (CCR) 323, a zero detector (ZND) 324, a bit search (BSC) 325 and a bus extension unit (BEX) 326. The general-purpose register group circuit 320 has a circuit configuration as described previously, and is used to hold data used for one or a plurality of data operations or address operations and the results of such operations executed by the ALU 322 or the barrel shifter 321. More specifically, data stored in the general-purpose register group circuit 320 can be supplied to the ALU 322 or the barrel shifter 321 via the buses B and C. The operation results obtained at the ALU 322 or the barrel shifter 321 can be supplied to and stored in the general-purpose register group circuit 320.

Figure 15:
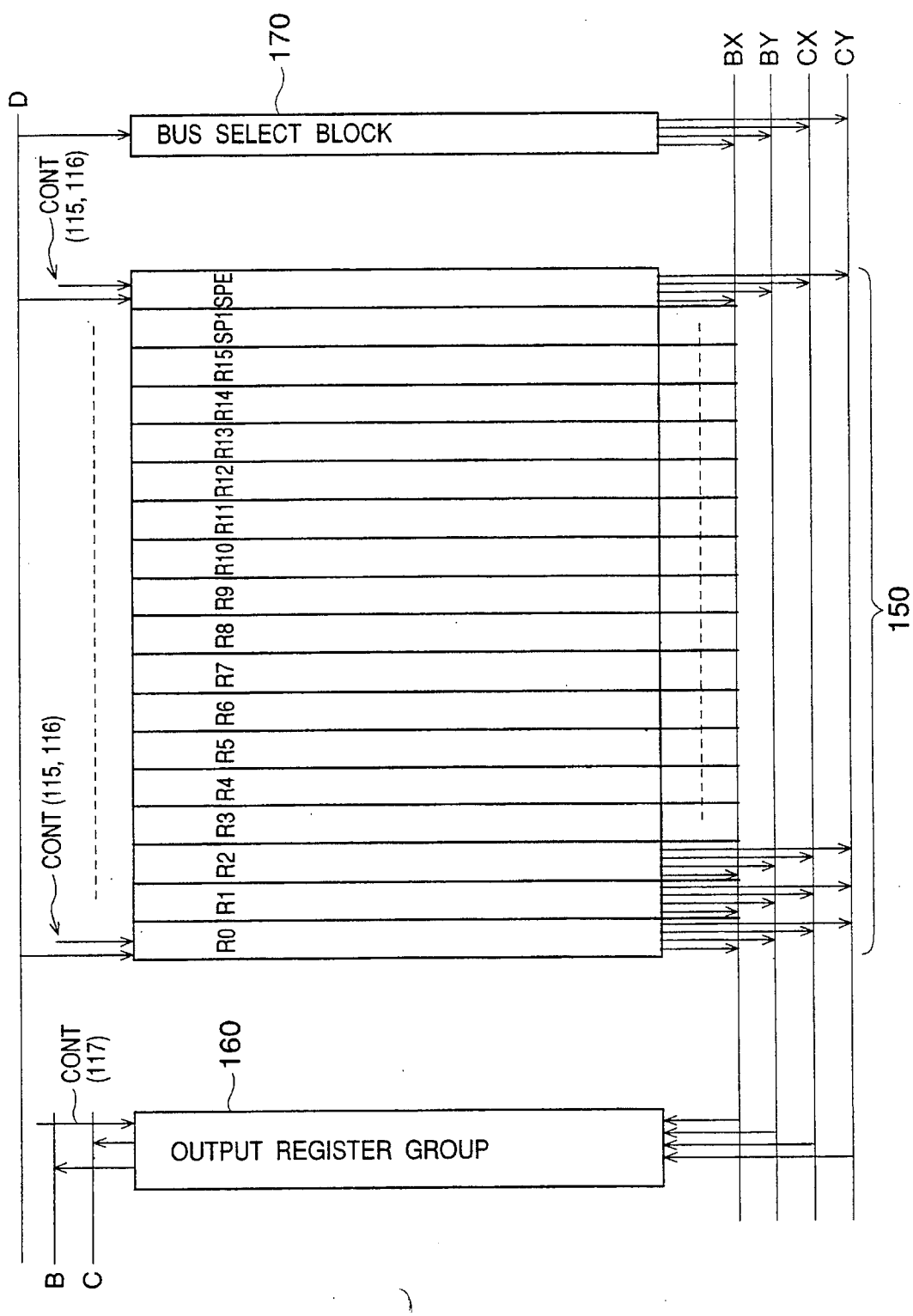
FIG. 15 is a block diagram of the general-purpose register group circuit shown in FIG. 14.

FIG. 15 is a block diagram of the structure of the general-purpose register group circuit 320 shown in FIG. 14. In FIG. 15, parts that are the same as those shown in the previously described figures are given the same reference numbers. The general-purpose register group block 150 shown in FIG. 15 includes 18 four-bit register groups labeled R0–R15, SP1 and SPE. These register groups are connected to the programmable logic array 301 by means of the signal lines via which the control signals CONT are transferred. More particularly, the above signal lines include the aforementioned signal lines 115 and 116 shown in FIGS. 6A and 6B, and the signals transferred via these signal lines include the RxLT_P, RxLT_N, RxB and RxC. The data bus D, that is, the aforementioned data bus 180 having the data bus lines 180a–180d is connected to the 18 register groups. Further, the buses BX, BY, CX and CY are connected to the 18 register groups. The bus BX includes the bus lines 181BX–184BX shown in FIGS. 6A and 6B, and the bus BY includes the bus lines 181BY–184BY. Similarly, the bus CX includes the bus lines 181CX–184CX shown in FIGS. 6A and 6B, and the bus CY includes the bus lines 181CY–184CY.

The output register group 160 is connected to the programmable logic array 301 via the signal lines 117 shown in FIG. 6B, and receives therefrom the control signals RBOUT and RCOUT, which are simply shown as CONT in FIG. 15. Further, the output register group 160 is connected to the buses B and C and the buses BX, BY, CX and CY. The bus select block 170 is connected to the buses D, BX, BY, CX and CY.

The levels of the above control signals are determined as described previously by means of the programmable logic array 301 in accordance with instructions supplied thereto.

The present invention is not limited to the specifically disclosed embodiments, and variations and modifications may be made without departing from the scope of the present invention.

What is claimed is:

1. A general-purpose register group circuit provided in a data processing system, said general-purpose register group circuit comprising:

a plurality of register groups connected to a first bus and a second bus, data being written into the plurality of register groups via the first bus according to a first control signal and being read therefrom via the second bus according to a second control signal, wherein the first bus is used to write data into the plurality of register groups and not to read data therefrom and wherein the second bus is used to read data from the plurality of register groups and not to write data thereto; and an output register group connected to the plurality of register groups via the first and second buses, the data read from the plurality of register groups being written into the output register group according to a third control signal, data read from the output register group being sent to an inner bus of the data processing system according to a fourth control signal, each of the plurality of register groups comprising a plurality of unit registers, each of which registers comprises first means for setting the second bus to either a high-impedance state or a reference level according to data latched therein and the second control signal, said output register group comprising second means for driving the inner bus according to a state of the second bus.

2. The general-purpose register group circuit as claimed in claim 1, wherein:

the inner bus comprises n bus lines where n is an integer; and the second bus comprises 2n bus lines.

3. A general-purpose register group circuit provided in a data processing system, said general-purpose register group circuit comprising:

a plurality of register groups connected to a first bus and a second bus, data being written into the plurality of register groups via the first bus according to a first control signal and being read therefrom via the second bus according to a second control signal; and an output register group connected to the plurality of register groups via the first and second buses, the data read from the plurality of register groups being written into the output register group according to a third control signal, data read from the output register group being sent to an inner bus of the data processing system according to a fourth control signal, each of the plurality of register groups comprising a plurality of unit registers, each of which registers comprises first means for setting the second bus to either a high-impedance state or a reference level according to data latched therein and the second control signal, said output register group comprising second means for driving the inner bus according to a state of the second bus, wherein:

each of the plurality of unit registers comprises a data latch unit capable of storing data of one bit, and an output unit which has said first means and outputs the data from the latch unit to the second bus; and the output unit of each of the plurality of unit registers comprising two first transistors of an N-channel type connected in series between the second bus and a ground defining the reference level, one of the first transistors being controlled by the data from the latch unit, the other one of the first transistors being controlled by the second control signal.

4. The general-purpose register group circuit as claimed in claim 3, wherein:

the inner bus comprises n bus lines where n is an integer; and the second bus comprises 2n bus lines.

5. The general-purpose register group circuit as claimed in claim 4, further comprising a bus select unit which selectively connects the first bus to a first half of the 2n bus lines of the second bus or a second half thereof in accordance with a fifth control signal.

6. The general-purpose register group circuit as claimed in claim 5, wherein:

the bus select unit comprises a plurality of unit output registers, each of which registers comprises:

third means for setting the first half of the 2n bus lines of the second bus to either the high-impedance state or the reference level according to data on the first bus and the fifth control signal; and fourth means for setting the second half of the 2n bus lines of the second bus to either the high-impedance state or the reference level according to the data on the first bus and the fifth control signal.

7. A general purpose register group circuit provided in a data processing system, said general-purpose register group circuit comprising:

a plurality of register groups connected to a first bus and a second bus, data being written into the plurality of register groups via the first bus according to a first control signal and being read therefrom via the second bus according to a second control signal;

an output register group connected to the plurality of register groups via the first and second buses, the data read from the plurality of register groups being written into the output register group according to a third control signal, data read from the output register group being sent to an inner bus of the data processing system according to a fourth control signal, each of the plurality of register groups comprising a plurality of unit registers, each of which registers comprises first means for setting the second bus to either a high-impedance state or a reference level according to data latched therein and the second control signal, said output register group comprising second means for driving the inner bus according to a state of the second bus, wherein the inner bus comprises n bus lines where n is an integer and the second bus comprises 2n bus lines; and a bus select unit which selectively connects the first bus to a first half of the 2n bus lines of the second bus or a second half thereof in accordance with a fifth control signal.

8. The general-purpose register group circuit as claimed in claim 7, wherein:

the bus select unit comprises a plurality of unit output registers, each of which registers comprises:

third means for setting the first half of the 2n bus lines of the second bus to either the high-impedance state or the reference level according to data on the first bus and the fifth control signal; and fourth means for setting the second half of the 2n bus lines of the second bus to either the high-impedance state or the reference level according to the data on the first bus and the fifth control signal.

9. A data processing system comprising:

instruction decoding means for decoding an instruction and deriving control signals therefrom; and instruction executing means, operatively coupled to said instruction decoding means, for performing an operation on data according to the control signals, said instruction executing means comprising a general-purpose register group circuit for storing data processed in the instruction executing means, said general-purpose register group circuit comprising:

a plurality of register groups connected to a first bus and a second bus, data being written into the plurality of register groups via the first bus according to a first control signal and being read therefrom via the second bus according to a second control signal, wherein the first bus is used to write data into the plurality of register groups and not to read data therefrom and wherein the second bus is used to read data from he plurality of register groups and not to write data thereto; and an output register group connected to the plurality of register groups via the first and second buses, the data read from the plurality of register groups being written into the output register group according to a third control signal, data read from the output register group being sent to an inner bus of the data processing system according to a fourth control signal, each of the plurality of register groups comprising a plurality of unit registers, each of which registers comprises first means for setting the second bus to either a high-impedance state or a reference level according to data latched therein and the second control signal, said output register group comprising second means for driving the inner bus according to a state of the second bus.

10. The data processing unit as claimed in claim 9, wherein:

the inner bus comprises n bus lines where n is an integer; and the second bus comprises 2n bus lines.

11. A data processing system comprising:

instruction decoding means for decoding an instruction and deriving control signals therefrom; and instruction executing means, operatively coupled to said instruction decoding means, for performing an operation on data according to the control signals, said instruction executing means comprising a general-purpose register group circuit for storing data processed in the instruction executing means, said general-purpose register group circuit comprising:

a plurality of register groups connected to a first bus and a second bus, data being written into the plurality of register groups via the first bus according to a first control signal and being read therefrom via the second bus according to a second control signal; and an output register group connected to the plurality of register groups via the first and second buses, the data read from the plurality of register groups being written into the output register group according to a third control signal, data read from the output register group being sent to an inner bus of the data processing system according to a fourth control signal, each of the plurality of register groups comprising a plurality of unit registers, each of which registers comprises first means for setting the second bus to either a high-impedance state or a reference level according to data latched therein and the second control signal, said output register group comprising second means for driving the inner bus according to a state of the second bus, wherein each of the plurality of unit registers comprises a data latch unit capable of storing data of one bit, and an output unit which has said first means and outputs the data from the latch unit to the second bus and wherein the output unit of each of the plurality of unit registers comprising two first transistors of an N-channel type connected in series between the second bus and a ground defining the reference level, one of the first transistors being controlled by the data from the latch unit, the other one of the data transistors being controlled by the second control signal.

12. The data processing unit as claimed in claim 10, wherein:

the inner bus comprises n bus lines where n is an integer; and the second bus comprises 2n bus lines.

13. The data processing unit as claimed in claim 12, further comprising a bus select unit which selectively connects the first bus to a first half of the 2n bus lines of the second bus or a second half thereof in accordance with a fifth control signal.

14. The data processing unit as claimed in claim 13, wherein:

the bus select unit comprises a plurality of unit output registers, each of which registers comprises:

third means for setting the first half of the 2n bus lines of the second bus to either the high-impedance state or the reference level according to data on the first bus and the fifth control signal; and fourth means for setting the second half of the 2n bus lines of the second bus to either the high-impedance state or the reference level according to the data on the first bus and the fifth control signal.

15. A data processing system comprising:

instruction decoding means for decoding an instruction and deriving Control signals therefrom; and instruction executing means, operatively coupled to said instruction decoding means, for performing an operation on data according to the control signals, said instruction executing means comprising a general-purpose register group circuit for storing data processed in the instruction executing means, said general-purpose register group circuit comprising:

a plurality of register groups connected to a first bus and a second bus, data being written into the plurality of register groups via the first bus according to a first control signal and being read therefrom via the second bus according to a second control signal; and an output register group connected to the plurality of register groups via the first and second buses, the data read from the plurality of register groups being written into the output register group according to a third control signal, data read from the output register group being sent to an inner bus of the data processing system according to a fourth control signal, each of the plurality of register groups comprising a plurality of unit register, each of which registers comprises first means for setting the second bus to either a high-impedance state or a reference level according to data latched therein and the second control signal, said output register group comprising second means for driving the inner bus according to a state of the second bus wherein the inner bus comprises n bus lines where n is an integer and the second bus comprises 2n bus lines; and a bus select unit which selectively connects the first bus to a first half of the 2n bus lines of the second bus or a second half thereof in accordance with a fifth control signal.

16. The data processing unit as claimed in claim 15, wherein:

the bus select unit comprises a plurality of unit output registers, each of which registers comprises:

third means for setting the first half of the 2n bus lines of the second bus to either the high-impedance state or the reference level according to data on the first bus and the fifth control signal; and fourth means for setting the second half of the 2n bus lines of the second bus to either the high-impedance state or the reference level according to the data on the first bus and the fifth control signal.

* * * * *